United States Patent [19]

Hubbell

[11] Patent Number: 5,174,522
[45] Date of Patent: Dec. 29, 1992

[54] AIRCRAFT VENTILATING VISOR SYSTEM

[76] Inventor: Timothy Hubbell, 921 Gunsight Ave., P.O. Box 3253, Page, Ariz. 86040

[21] Appl. No.: 382,211

[22] Filed: Jul. 20, 1989

[51] Int. Cl.⁵ .............................................. B64D 13/00
[52] U.S. Cl. ................................... 244/1 R; 244/118.5; 244/129.1; 454/76; 454/155; 296/97.2
[58] Field of Search ................. 244/118.5, 129.1, 1 R; 296/97.5, 97.1, 97.2; 454/69, 71, 76, 152, 154, 155

[56] References Cited

U.S. PATENT DOCUMENTS

| | | | |
|---|---|---|---|
| 2,160,504 | 5/1939 | Jacobs | 296/97.2 |
| 2,377,794 | 6/1945 | Lobelle | |
| 2,445,413 | 7/1948 | Webster | |
| 2,849,760 | 9/1958 | Boeke et al. | |
| 3,475,080 | 10/1969 | Shumway | 296/97.2 |
| 3,861,281 | 1/1975 | Godwin | 98/2 |
| 3,898,921 | 8/1975 | Trube | 98/2 |
| 4,462,303 | 7/1984 | Gebhard | |
| 4,682,536 | 7/1987 | Nolting | |

FOREIGN PATENT DOCUMENTS

| | | | |
|---|---|---|---|
| 3316817 | 11/1984 | Fed. Rep. of Germany | 98/2.08 |
| 649227 | 12/1928 | France | |
| 653865 | 3/1929 | France | |
| 674658 | 1/1930 | France | |

OTHER PUBLICATIONS

Automotive Industries, Aug. 27, 1932, p. 39, Weather Shields, Ltd. visor-ventilator.

Primary Examiner—Galen Barefoot
Attorney, Agent, or Firm—James Creighton Wray

[57] ABSTRACT

Aircraft ventilating visor systems have small tubes insertable in openings into fresh air wing conduits at the interfaces of wings and cabins near the upper portions of windshields in high wing aircraft. Existing pull-open, push-closed turnable air directors are removed and replaced with hollow tubes which supply air to hollow visors. Thin louver-controlled openings along lower edges of the visors control and direct air supplied to front seat occupants.

Larger central openings in the rear faces, when the visors are in the down position, are controlled by directional louvers to supply air axially through the aircraft between the front seats to passengers in rear seats. An outside air temperature gauge in mounted axially in one of the connecting tubes. The hollow visors are made of clear see-through, tough, plastic material, and have guides into which removable amber glare-reducing plates are fitted.

10 Claims, 2 Drawing Sheets

AIRCRAFT VENTILATING VISOR SYSTEM

BACKGROUND OF THE INVENTION

Aircraft cabins may become hot and stuffy, especially while flying at low altitudes in warm, sunny weather. When flying in other conditions, the cabin requires constant fresh air ventilation. In multiple seat aircraft, it is extremely important to supply the ventilation throughout the aircraft.

Ventilation supplied along the sides of the cabin is unsatisfactory, and a need exists for a system which will supply air in the center of the cabin and which will direct air to the places where it is desired.

Existing ventilation systems for small aircraft have air intakes on leading edges of wings, and air conduits leading from the air intakes inward within the wing and opening into an upper part of the cabin where the wing joins the body of the aircraft. The usual ventilation control is a telescoping slide-open, push-closed, turnable cylindrical valve, which is open at the end leading into the wing conduit, and which has an elongated rectangular opening in a side wall for controlling and directing air flow. The inner end of the valve is closed and may support a circular thermometer with an axial sensing probe to provide an outside air temperature gauge. Usually the face of the gauge is directed across the aircraft rather than toward the pilot, making the gauge difficult to read. Under darkened conditions or when flying at night, a flashlight must be used to read the gauge.

The movable cylinder usually has spring-loaded friction buttons which prevent overtravel of the cylinder into the cabin, and which glide along the inner surface of the wing conduit to hold the cylindrical valve in the selected axial extension and radial rotation so that none, all or a part of the rectangular opening opens into the aircraft. The cylindrical valve is turned to control the direction of flow and is pulled inward in the cabin to increase the flow. The flow is always along the side of the cabin. A deflector in the closed end of the valve attempts to deflect the flow angularly toward the middle of the cabin.

Cold air from the pull-open, push-closed, cylindrical vent valves tends to strike the outside shoulders of front seat occupants, blocking flow to the rear of the cabin and providing non-uniform flow over the front seat occupants.

Many problems remain with the use of the existing air vent controls for small aircraft.

SUMMARY OF THE INVENTION

The present invention provides an aircraft ventilating system which provides uniform air flow in desired directions over the occupants of the front seat, and provides air flow axially in the aircraft to passengers in rear seats, solving problems inherent in the prior art.

Aircraft ventilating visor systems have small tubes insertable in openings into fresh air wing conduits at the interfaces of wings and cabins near the upper portions of windshields in high wing aircraft. Existing pull-open, push-closed air directors are removed and replaced with hollow tubes which supply air to hollow visors. Thin louver-controlled openings along lower edges of the visors control and direct air supply to front seat occupants.

Larger central openings on the rear face when the visors are in the down position are controlled by directional louvers to supply air axially through the aircraft between the front seats to passengers in rear seats. An outside air temperature gauge is mounted axially in one of the connecting tubes. The hollow visors are made of clear see-through, tough plastic material, and have guides into which removable amber glare-reducing plates are fitted.

The air ventilating visor is constructed of a rugged, see-through plastic material with movable louvers to direct airflow in an aircraft cabin for pilot and passenger comfort. The see-through plastic adds a measure of safety not otherwise offered through the conventional visor.

The tube connecting the hollow visor to a fixed air conduit includes outside air temperature (OAT) gauge, a required instrument for the aircraft.

Air ventilating visors for use on Cessna 100 & 200 series aircraft replace the existing airflow systems in the aircraft. The present system does not require special tools or knowledge for proper installation. Easy removal is provided for cleaning and maintenance. The present system replaces existing independent vents and visor systems.

The hollow visor has a cabin airflow louver and a pilot airflow louver. A holding clip is provided to attach an optional shade screen made of tinted plastic.

The air ventilating visor is constructed of a plastic material not subject to warping or heat discoloration. The tint is amber to allow good visual reference to enhance aviation safety when the air ventilating visor is in use. There is an additional option to reduce sun glare yet maintain the quality of the safety factor. This optional slide is made of a heavier tint gradient and slips into a clip on the top of the air ventilating visor.

The air ventilating visor offers a new concept not currently on the market. Its advantages include increased airflow in the cabin for pilot and passenger comfort, an increase in visual contact between the pilot and other air traffic, and complete sealing of the existing aircraft venting system, which allows greater comfort during colder weather. The OAT gauge is located in a more convenient location for the pilot.

This invention provides new aircraft ventilation systems for small aircraft having conventional air intakes in wings and conduits within the wings connected to the intakes for conducting outside air from the intakes to passenger cabins. A new air ventilation distributor in the passenger cabin has a hollow air conductor member connected to the conduit and extended across an aircraft inside an upper portion of a windshield. Plural louvers in the hollow member release and direct air from the hollow member into the cabin.

In a preferred form, the hollow member comprises a transparent hollow visor and a tube connecting the visor to the conduit.

Preferably an outside air temperature gauge is mounted in the tube connecting the conduit to the hollow member.

In preferred embodiments, the louvers include an elongated louver near a bottom of a visor for supplying air to a front seat occupant, and a large louver on the visor near a center of the aircraft for supplying air to the cabin behind the front seat.

In preferred embodiments, the hollow members extend across the cabin, and the visors include first and second visors, and a central support interconnects the visors. A hollow central support tube pneumatically connects the visors. In one embodiment air may flow from the central tube into the cabin.

Preferably the aircraft includes a second air inlet in the opposite wing and a second conduit connecting the second air inlet to the hollow member, and the hollow member includes a second tubular member connected between the second visor and the second conduit. In that embodiment, the louvers include elongated louvers positioned along bottoms of the first and second visors for supplying air to persons in front seats, and upper louvers near the central connector for supplying air to the cabin behind the front seat.

One embodiment of the invention provides ventilation air apparatus, with a hollow air conductor stretching across an aircraft windshield between cabin air inlets in cabin-wing interface surfaces. Plural louvers in the conductor direct air in plural selected directions from plural selected positions on the conductor.

Preferably the conductor has first and second hollow tubes for connecting wing air conduits with the hollow conductor, first and second hollow transparent visors and an interconnector between the visors. The preferred louvers are first and second elongated louvers at lower portions of the first and second visors respectively, and first and second large lumen louvers in the visors near the interconnector.

An outside air temperature indicator is mounted in one of the connecting tubes.

Preferably the visors are made of a clear, tinted material for permitting looking through the visor and for reducing light energy passing through the visors.

The present invention provides a new and unobvious fresh air vent system without providing additional weight or parts to aircraft, and replaces existing single function parts with multifunction parts, increasing functionality of the parts without adding complexity or weight.

These and other and further objects and features of the invention are apparent in the disclosure, which includes the above and ongoing specification, with the claims, and the drawings.

DETAILED DESCRIPTION OF THE DRAWINGS

Figure 2:
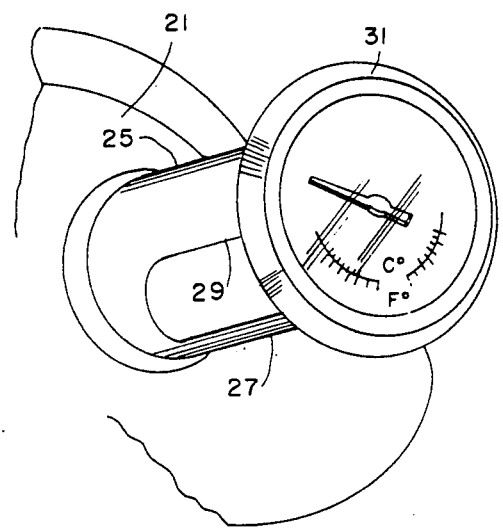
FIG. 2 is a detail of a conventional ventilating system.
Figure 3:
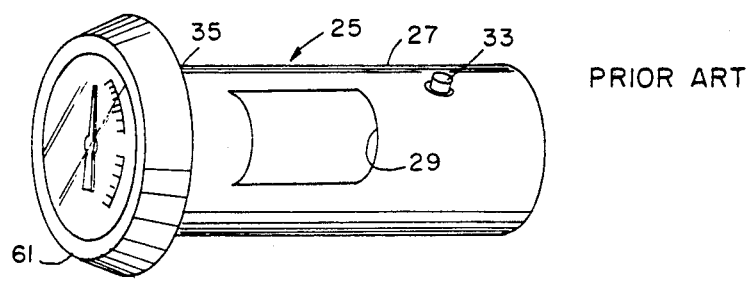
FIG. 3 is a detail of a conventional cylindrical ventilation valve.

Referring the to the drawings, a small aircraft is generally indicated by the numeral 11. The aircraft had a body 13, a cabin 15, and wings 17 with leading edges 19. Leading portions of the wings join the cabin in cabin-wing interface surfaces 21. Air intakes 23 in leading edges of the wings provide air to conduits within the wings. The conduits open in the cabin-wing interface 21 and hold ventilation air control valves 25. As shown in FIG. 2, a prior art ventilation air control valve 25 has a cylindrical body 27 with a rectangular opening 29 in a side wall. An inner end is closed and supports an air temperature gauge 31. As shown in FIG. 3, the cylinder body 27 of the control valve 25 has spring-loaded friction reducing buttons 33 which press outwardly from the cylinder against inner walls of the conduit within the wing. The buttons provide sliding of the valve 25 and prevent inward overtravel. The lumen of the rectangular opening 29 is increased by sliding the valve 25 inwardly, and the angle of discharge is controlled by twisting the valve 25 on its axis. The buttons 33 tend to hold the valve in its selective axial and radial positions. A curved deflector plate within the closed end 35 tends to spread the air flowing from the opening 29. The valve is closed simply by pushing the cylindrical valve body 27 all of the way into the wing conduit so that the opening 29 is fully concealed within the conduit.

Figure 1:
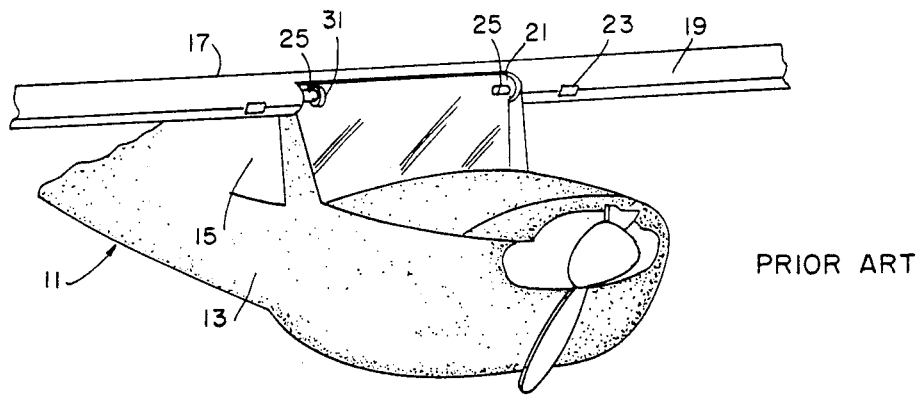
FIG. 1 shows a conventional small aircraft with a conventional ventilation system.

The conventional prior art system as shown in FIGS. 1, 2 and 3 has been used for many years with the attendant problems of control and incomplete ventilation as described above.

Figure 4:
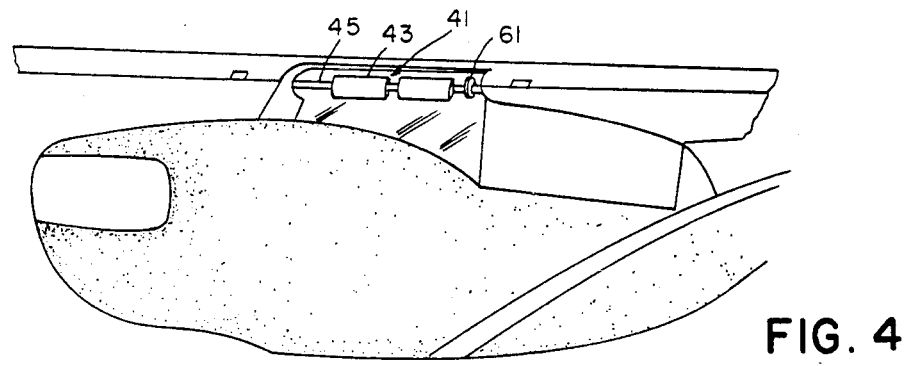
FIG. 4 is a schematic representation of an aircraft using the air ventilation system of the present invention.
Figure 5:
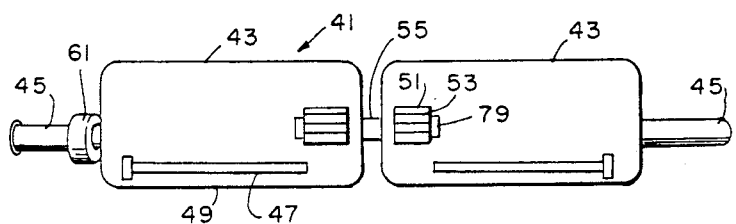
FIG. 5 is a detail of the system shown in FIG. 4.
Figure 6:
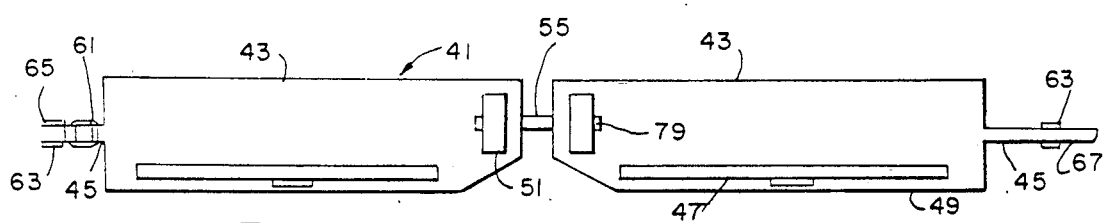
FIG. 6 is a schematic representation of the ventilation system of the present invention.

The present invention provides an integrated air ventilation system generally indicated by the numeral 41 in FIGS. 4, 5 and 6. Two hollow transparent visors 43 are joined to openings of the wing air conduit with connecting tubes 45. Louver-controlled openings 47 along the lower edge 49 of the visors permit air to be selectively directed over the faces and upper bodies of front seat occupants. Large lumen openings 51 in the visors near the center of the aircraft are controlled by louvers 53 to direct air rearwardly and centrally through the aircraft. The visors 43 are connected centrally by interconnector 55 extending between inner edges 57 of the visors.

In one embodiment, the interconnector 55 is tubular. In that embodiment, the interconnector 55 may permit passage of air between the visors 43.

In one embodiment, the interconnector 55 is connected to directional louvers 53 for turning the louvers to simultaneously open and close both openings 51 and to direct air out of the openings. In a preferred embodiment, the louvers are separately controlled in each opening to providing opening and closing of the openings and to direct air from the openings.

In a preferred embodiment of the invention, an air temperature gauge 61 is mounted in one of the tubes 45 that connect the visors 43 with the aircraft wing air conduits.

Figure 7:
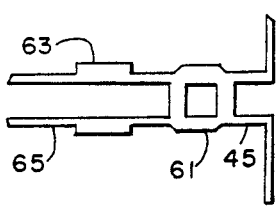
FIG. 7 is a schematic detail of an outside air temperature gauge mounted on a connecting tube of the present invention.

As shown in FIGS. 6 and 7, each tube 45 is provided on its end with a sealing bearing material 63, which is inserted into the wing air conduit and which holds the assembly in its selected rotational position. In a preferred embodiment, each visor 43 may be rotated independently of the other visor around interconnector 55 and bearing 63. In the preferred installation, the conventional cylindrical valve 25 is removed from the wing conduit, the distal end 65 of each tube 45 is pushed into the wing conduit with the bearing sealing rings 63 engaging the inner wall of the conduit. Finally, the interconnecting element 55 is inserted between the visors 43 to hold the visors assembled. In another embodiment as shown in FIG. 4, the entire assembly is integral and the assembly is first pushed into the wing conduit on the right hand side of the aircraft, inserting the elongated end 67 of the right hand tube 45. Then the entire assembly 41 is moved to the left, inserting end 65 into the left wing air conduit until both sealing bearings remain in the conduits. The sealing bearings 63 may be provided with spring-loaded buttons to prevent axial movement of the telescoping tubes 45 within the wing conduits.

Figure 8:
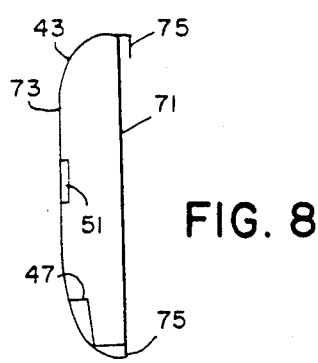
FIG. 8 is a cross-sectional view of a preferred visor of the present invention.

As shown in FIG. 8, the hollow visor 43 has a forward wall 71 and a rearward wall 73 in which louver-controlled openings 47 and 51 are positioned.

Figure 9:
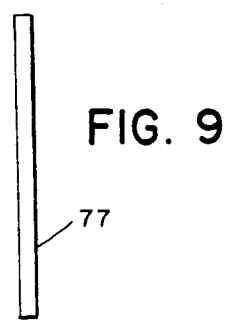
FIG. 9 is an end view of a shade screen for attaching to the visor.

Clips 75 are provided at upper and lower edges of the front surface 71 of the visors 43. An amber tinted shade screen 77 shown in FIG. 9 is positionable within the clips for use in conditions of brights sunshine. The entire ventilation system 41 of the present invention is transparent so that a pilot's vision is not obstructed.

Instead of using conventional louvers to control the openings 47 and 51, doors with handles may be provided. The pivoted door may be partially opened to deflect the air flow, closed to stop the air flow, or fully opened to provide air flow parallel to the axis of the aircraft.

While the invention has been described with reference to specific embodiments, modifications and variations of the invention may be constructed without departing from the scope of the invention, which is described in the following claims.

I claim:

1. An aircraft ventilation system comprising an intake in a wing, a conduit within the wing connected to the intake for conducting outside air from the intake to a passenger cabin, an air ventilation distributor in the passenger cabin comprising hollow air conductor member connected to the conduit and extending across an aircraft inside an upper portion of a windshield, and plural independently controllable louvers in the hollow member for releasing and directing air from the hollow member into the cabin of the aircraft, wherein the hollow member comprises a hollow visor, and further comprising a tube connecting the hollow visor to the conduit within the wing.

2. The apparatus of claim 1, further comprising an outside air temperature gauge mounted in the tube connecting the conduit to the hollow visor.

3. The apparatus of claim 1, wherein the hollow member extends across the cabin, and wherein the hollow visor comprises first and second hollow visors, and further comprising a central tube interconnecting the visors.

4. The apparatus of claim 1, further comprising a second wing air inlet and a second conduit connecting the second air inlet to a second hollow member.

5. An aircraft ventilation system comprising an intake in a wing, a conduit within the wing connected to the intake for conducting outside air from the intake to a passenger cabin, an air ventilation distributor in the passenger cabin comprising hollow air conductor member connected to the conduit and extending across an aircraft inside an upper portion of a windshield, and plural independently controllable louvers in the hollow member for releasing and directing air from the hollow member into the cabin of the aircraft, wherein the hollow member comprises a hollow visor, and further comprising a tube connecting the hollow visor to the conduit within the wing, wherein the louvers comprise an elongated louver near a bottom of the visor for supplying air to a front seat occupant, and a louver in the visor near a center of the aircraft for supplying air to the cabin behind the front seat.

6. An aircraft ventilation system comprising an intake in a wing, a conduit within the wing connected to the intake for conducting outside air from the intake to a passenger cabin, an air ventilation distributor in the passenger cabin comprising hollow air conductor member connected to the conduit and extending across an aircraft inside an upper portion of a windshield, and plural independently controllable louvers in the hollow member for releasing and directing air from the hollow member into the cabin of the aircraft, wherein the hollow member comprises a hollow visor, and further comprising a tube connecting the hollow visor to the conduit within the wing, a second wing air inlet and a second conduit connecting the second air inlet to a second hollow member, wherein the second hollow member comprises a second tube connected between a second hollow visor and the second conduit, and wherein the louvers comprise elongated louvers positioned along lower edges of the first and second hollow visors for supplying air to persons in front seats, and upper louvers near a center of the aircraft for supplying air to the cabin behind the front seat.

7. Small aircraft ventilation air apparatus, comprising a hollow air conductor for stretching across a windshield from a cabin air inlet in a cabin-wing interface surface, plural louvers in the conductor for directing air in multiple selected directions from selected positions on the conductor, wherein the conductor comprises first and second hollow tubes for connecting wing air conduits with the hollow conductor, first and second hollow visors and means interconnecting the visors, and wherein the louvers comprise first and second elongated louvers at lower portions of the first and second visors respectively for supplying air to front seat occupants, and first and second large lumen louvers in the visors near the interconnecting means for supplying air to seat occupants behind front seats.

8. The apparatus of claim 7, further comprising an outside air temperature indicator in one of the connecting tubes.

9. The apparatus of claim 7, wherein the hollow visors are made of a clear, tinted material for reducing light energy passing through the visors and for visual access through opposite walls of the hollow visors.

10. An aircraft ventilation system comprising an intake in a wing, a conduit within the wing connected to the intake for conducting outside air from the intake to a passenger cabin, an air ventilation distributor in the passenger cabin comprising hollow air conductor member connected to the conduit and extending across an aircraft inside an upper portion of a windshield, and plural independently controllable louvers in the hollow member for releasing and directing air from the hollow member into the cabin of the aircraft, wherein the hollow member comprises a hollow visor, and further comprising a tube connecting the hollow visor to the conduit within the wing, wherein the hollow member extends across the cabin, and wherein the hollow visor comprises first and second hollow visors, and further comprising a central tube interconnecting the visors, having means for an air flow from the central tube into an aircraft cabin.

* * * * *